United States Patent Office 3,030,823
Patented Apr. 24, 1962

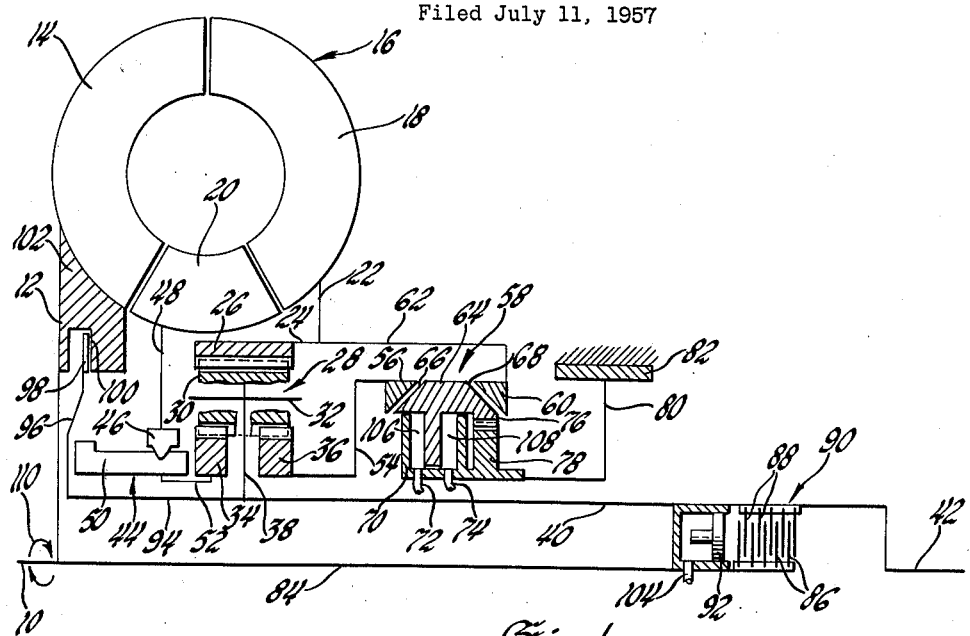

3,030,823
TRANSMISSION
Oliver K. Kelley, Bloomfield Hills, Mich., assignor to General Motors Corporation, Detroit, Mich., a corporation of Delaware
Filed July 11, 1957, Ser. No. 671,301
12 Claims. (Cl. 74—677)

This invention relates to an automatic transmission.

An object of this invention is to provide an automatic transmission that is economical to manufacture and simple and compact in design.

A further object of this invention is to provide an automatic transmission employing the use of a torque converter combined with planetary gearing to provide two forward speed ratios, neutral, and a reverse ratio.

A further object of this invention is to provide a transmission having a hydrodynamic drive device comprising a pump and two turbines, one of said turbines being held stationary at times to act as a reaction member and at other times being rotated rearwardly in relation to the direction of rotation of said pump to drive said transmission in reverse.

A further object of this invention is to provide an automatic transmission having a torque converter with a normally forwardly rotating turbine for providing a forward drive ratio with a brake member on said turbine to hold said turbine to provide a reverse drive ratio by driving the stator or reaction member in a reverse direction.

A still further object of the invention is to provide novel vibration dampening mechanism.

Other features, advantages and objects will become apparent by reference to the detailed description of the invention and to the drawings wherein:

FIGURE 1 is a diagrammatic illustration of an automatic transmission embodying this invention, and FIGURE 2 is a modification of the transmission of FIGURE 1.

Referring now to the drawings and more particularly to FIGURE 1, there is shown an input shaft 10 adapted to be driven by a suitable internal combustion engine (not shown). Attached to input shaft 10 by means of an extending flange 12 is the pump 14 of a conventional torque converter 16 having a turbine 18 and a stator-turbine or reaction member 20. The blades of the turbine and stator are shaped in the conventional manner so that at low forward speeds of the pump, the fluid leaving the forwardly rotating turbine will strike the stator blades in a manner to attempt to rotate it in a direction opposite to the direction of rotation of the pump, while at higher pump speeds, the fluid leaving the turbine will strike the stator blades at a more favorable angle to rotate the stator in the same direction as that of the pump.

Connected to the turbine 18 by drive connections 22 and 24 is the ring gear 26 of a planetary gear set 28. Meshing with the ring gear 26 is a plurlaity of planet pinions 30 rotatably mounted upon a carrier member 32 and meshing with a plurality of sun gears 34 and 36 of equal size and diameter. Attached to an extension 38 of the carrier 32 is a relatively long sleeve 40 being formed integrally with the output shaft 42 of the transmission. Connecting stator-turbine member 20 and the sun gear 34 is a one-way engaging device 44 having one race 46 connected to the stator by a drive connection 48, with the other race 50 connected to the sun gear 34 by drive connection 52. One-way engaging device 44 is constructed as shown in FIGURE 1, to permit relative rotation of reaction member 20 in a forward direction relative to the rotation of sun gear 34 while preventing reverse rotation of reaction member 20 relative to sun gear 34. Attached to sun gear member 36 by means of a connection 54 is one cone brake element 56 of a double acting brake mechanism 58 having a second cone brake element 60 attached to an extension 62 of the ring gear drive connecting means 24. This double acting brake mechanism comprises a piston element 64 having friction faces at opposite sides 66 and 68 adapted to cooperate with the friction faces on the cone brake elements 56 and 60, respectively, and is alternately engageable therewith by movement of the piston 64 within a stationary casing 70 in either direction upon admission or exhaust of fluid through suitable conduits 72 and 74 to or from either side of the piston. The piston 64 has an extension 76 slidably splined to a flange portion 78 of the casing 70, which in turn is prevented from rotating by a connection 80 with the stationary casing 82.

An extension 84 of the drive shaft 10 is provided parallel with the sleeve 40 and is provided with friction clutch plates 86 splined thereto and adapted to cooperate with a plurality of friction clutch plates 88 splined to sleeve 40. With the brake 58 released, and plates 86 and 88 engaged, this clutch 90 constitutes a direct drive clutch connecting the sleeve 40 and extension 84 of the drive shaft 10 to provide a direct drive between the input and output shafts, thereby permitting the torque converter and planetary gear set to idle. A suitable piston 92 is provided for engaging this clutch, with a spring (not shown) disengaging said clutch, as is the conventional manner of accomplishing the same. Formed on an extension 94 of the sleeve 40 is a flexible flange portion 96 in the form of a Belleville spring having a friction face 98 at its outer periphery adapted to cooperate with a friction face 100 formed on an enlarged portion 102 of the extension 12 of drive shaft 10. This Belleville spring 96 is normally stressed as to cause engagement of the faces 98 and 100, and constitutes a vibration dampening means to dampen the torque impulses of the engine imparted to input shaft 10 to provide smooth continuous acceleration and deceleration of output shaft 42. Normally, with the direct drive clutch 90 disengaged, the torsional vibrations of the engine will be dampened through the torque converter 16, and therefore no vibration dampening means need be provided. Therefore, it would be undesirous to have the friction disks 98 and 100 engaged during disengagement of direct drive clutch 90. To effect this disengagement, the gear set 28 together with the one-way engaging means 44 is positioned slidably upon the sleeve 40 in close adjacency to the Belleville spring 96. Upon application of torque through the gear set by the driving of ring gear 26, the torque imparted to the helical gears will imply a thrust acting to move the gear set 28 together with the one-way engaging means 44 in a direction to the left, as seen in FIGURE 1, to abut against the Belleville spring 96 to disengage the friction faces 98 and 100, thereby relieving these disks of scrubbing action between the input shaft extension 12 and the sleeve 40. With the direct drive clutch 90 engaged connecting sleeve 40 and drive shaft extension 84, the torque on the gear set 28 from the input shaft 10 is relieved thereby relieving the thrust on the gear set 28 and returning the gear set to a position normally attained when the torque converter and gear set are free to idle, thereby permitting the normal action of the Belleville spring to engage the disks or faces 98 and 100 to dampen the vibrations of the engine through the long sleeve 40. Because of the length of the shaft 84 connecting with the output shaft 42 through clutch 90, the shaft 84 acts as a torsion spring permitting twisting or turning by torque on its end adjacent the Belleville spring to be taken up by the length of the sleeve to nullify the effect at the other end of the shaft 84 adjacent the output shaft 42.

OPERATION

Neutral

In neutral position of the transmission, fluid from any suitable source (not shown) is admitted through both conduits 72 and 74 to position the piston 64 midway between cone brake members 56 and 60, while at the same time fluid is exhausted from the cylinder 92 through a suitable conduit 104 to permit the spring (not shown) to disengage the direct drive clutch 90. With the brake members and clutch member disengaged, rotation of input shaft 10 will drive the torque converter 16 to drive the gear set 28, which will idle without driving output sleeve 40 and output shaft 42 because of the lack of any reaction member.

Forward

Low speed forward reduction drive is obtained by draining the fluid in chamber 106 through the conduit 72 without exhausting the fluid in chamber 108, thereby causing the piston 64 to move to engage friction face 66 with the cone brake member 56 to thereby hold sun gear 36 stationary permitting the sun gear to act as a reaction member for the gear set. Because sun gear 34 has the same number of teeth as sun gear 36 and because of the common meshing action with the pinions 30, sun gear 34 will likewise be prevented from rotating. Since the stator-turbine 20 is prevented from rotating in a reverse direction relative to the direction of rotation of sun gear member 34 by the one-way engaging means 44, upon initial forward rotation of input shaft 10 in a clockwise direction as indicated by the arrow 110 in FIGURE 1, torque multiplication occurs in the torque converter with the pump 14 being rotated forwardly to rotate the turbine 18 forwardly thereby driving the ring gear 26 to provide a reduction drive in the gear set 28 by the planet carrier 32 planetating or rolling about the stationary reaction sun gears 34 and 36, thereby driving sleeve 40 and output shaft 42 at a reduction forward drive from said input shaft 10.

Upon application of torque to the ring gear by turbine 18, the gear set 28 will have exerted thereon a thrust to slide the gear set on sleeve 40 together with the one-way engaging means 44 to disengage the vibration dampening disks 98 and 100.

Upon further rotation of input shaft 10 and increase in speed of turbine 18, the fluid will leave the turbine and strike the stator-turbine 20 at a more favorable angle to start rotating the stator or reaction member forwardly, which is permitted by the one-way engaging means 46. The torque converter will then assume the characteristics of a fluid coupling without torque multiplication.

High Speed or Direct Drive

At about the time that the stator or reaction member 20 begins to freewheel, or at a later time depending upon the design of the transmission, fluid will be introduced into conduit 104 of the direct drive clutch to engage the same while at the same time fluid will be introduced through chamber 106 of the brake through conduit 72 to neutralize piston member 64 to disengage both cone brakes 56 and 60. As a result, the sun gear members 34 and 36 will be free to rotate and the gear set 28 will idle thereby relieving the thrust on the gear set and permitting the gear set together with the one-way engaging means 44 to be moved slidably on the shaft 40 to a position out of engagement with the Belleville spring to permit the clutch disks 98 and 100 to engage. With the vibration dampener and the direct drive clutch 90 engaged, the vibration dampener together with the long shaft 84 will dampen the vibrations of the engine and a direct drive will be produced from the input shaft 10 to the output shaft 42.

Forward Coast

Upon release of the driving torque by release of the accelerator pedal, with the vehicle coasting in a forward direction causing output shaft 42 to be the driving member, and with the transmission in reduction drive by engagement of brake 56 and release of clutch 90, the planet carrier 32 will rotate ring gear 26 and thus turbine 18 in a forward direction at an overdrive ratio, thereby creating a braking effect due to the turbine attempting to rotate the pump faster than it is being rotated by the engine. This would be equivalent to engine braking.

Reverse Coast

If the vehicle is standing still on an incline and is permitted to coast rearwardly, reverse rotation of output or driven shaft 42, with the transmission in reduction drive ratio, will cause rotation of ring gear 26 and turbine 18 backwardly at an overdrive ratio. However, since the pump 14 is rotating in a forward direction, a considerable engine braking effect is produced thereby retarding coast in this direction.

Reverse

A reverse drive is obtained by exhausting the fluid in chamber 108 of the brake 58 through the conduit 74 to permit movement of the piston 64 to engage brake 60 to hold the turbine 18 and ring gear 26 stationary thereby changing the ring gear from a driving member in forward drive to a reaction member for reverse drive. The clutch 90 is also disengaged by exhausting fluid through conduit 104. Upon release of brake 56, sun gears 34 and 36 will be free to rotate in either direction.

Upon forward rotation of pump 14 by input shaft 10, turbine 18 being held stationary by brake 60, reaction member 20 acts as a turbine and will rotate in a reverse direction due to the angle at which the fluid leaving the turbine strikes the blades of member 20 to cause the one-way engaging means 44 to engage to drive the sun gear 34 in a reverse direction, which is now permitted by freely rotating cone brake 56. With ring gear 26 stationary and acting as a reaction member, carrier 32 will planetate in a reverse direction to drive the sleeve 40 and output shaft 42 in a reverse direction and at a reduced speed compared to the speed of the input shaft 10.

Referring now to FIGURE 2, there is shown a modification of the transmisison of FIGURE 1. This transmission is similar in most respects to that of the transmission of FIGURE 1, and therefore only the differences will be described. In this transmission, a one-way engaging device 112 is provided between the sun gear member 36' and the brake 56' and has one race 114 connected to the sun gear 36' by a member 116 with a second race 118 connected to the brake 56' by connection 120. This construction permits overrun of the sun gear with respect ot the brake member in a forward direction of rotation while preventing reverse rotation of the sun gear with respect to brake member 56'.

Also provided in this modification is a one-way engaging means 122 connecting the ring gear 26' and the carrier 32', this device having one race 124 connected to the ring gear drive connection 24' with the other race 126 connected to the carrier 32'. This permits forward rotation of the turbine memer 18' with respect to the carrier 32', while preventing faster rotation of the carrier 32' in a forward direction with respect to rotation of the turbine 18'.

OPERATION

Neutral

In the operation of this modification, neutral is obtained in the same manner as in the embodiment of FIGURE 1, i.e., both of the brakes 56' and 60' and the clutch 90' are disengaged to permit the gear set to idle freely.

Low Forward Speed

Upon application of brake band 56' and rotation of pump 14' by input shaft 10', turbine 18' will rotate forwardly with stator 20' attempting to rotate in a reverse direction, which will be prevented by the one-way engaging means 44' and 112 as seen in FIGURE 2. One-way engaging means 122 permits forward rotation of turbine 18' faster in a forward direction than the carrier 32 and thus a forward reduction drive is obtained to the output shaft 42'.

At higher speeds of pump 14' and turbine 18, stator-turbine 20 will begin to rotate in a forward direction causing, because of one-way engaging devices 44' and 112, the sun gear members 34' and 36' to also rotate forwardly. Upon further forward rotation of stator-turbine 20' up to a point where turbine 18' and turbine 20' are rotating at approximately the same speed, the gear set 28' will be approximately rotating as a unit because of the ring gear 26' and sun gear members 34' and 36' being driven at approximately the same speed. At this time, the transmission will be in an approximate direct drive ratio from the input shaft 10 to the output shaft 42', the variations from a direct drive being the difference in speeds between the pump 14' and the turbine 18' because of the inherent slip in the torque converter.

High Speed

High speed or direct drive is obtained in the same manner as in the embodiment of FIGURE 1, i.e., clutch 90' is engaged to provide a direct drive from input shaft 10' to output shaft 42' with brake 56' disengaged.

Forward Coast

Upon relaxation of the drive from input shaft 10', and with the output shaft 42' becoming the driver as would be the case when the vehicle is coasting in a forward direction, the carrier 32' will attempt to drive the ring gear forwardly at an overdrive ratio. However, due to the one-way engaging means 122, the ring gear and turbine 18' will be driven at the same speed as the carrier 32' thereby exerting an engine braking effect because of the attempt to drive the impeller or pump 14' faster than it is being driven by the engine.

Reverse

Upon application of cone brake 60' with release of brake 56' and clutch 90', turbine 18' will be held along with ring gear 26' to provide a reverse reduction drive in the transmission. This is accomplished upon rotation of input shaft 10' and pump 14' by the reverse rotation of stator-turbine 20' with one-way engaging means 44' engaging to rotate sun gear members 34' and 36' rearwardly thereby rotating the carrier 32' and output shaft 42' in a reverse direction and at a reduced speed relative to the input shaft speed.

From the foregoing it will be seen that applicant has provided an economical transmission having two forward speed ratios, neutral and reverse, and one that is compact and simple in design making it easy to assemble and repair. It will also be seen that applicant has provided a novel vibration dampening means to dampen impulses of the engine. It will be understood that the invention can be modified beyond the illustrated embodiments, and therefore, any limitations to be imposed are those set forth in the following claims.

I claim:
1. A transmission comprising an input shaft, an output shaft, and means connecting said shafts for providing a plurality of forward speed ratios, neutral and reverse, said means including a hydrodynamic drive device and planetary gear means, said drive device having a pump and a plurality of turbine members, said pump being connected to said input shaft, said gear means having a ring gear, a plurality of sun gears, and a pinion meshing with said ring and sun gears, a carrier for said pinion connected to said output shaft, said sun gears being of the same size, said ring gear being connected to one of said turbine members for rotation therewith, and means connecting another of the turbine members with one of said sun gears, brake means for holding another of said sun gears from rotation, brake means for holding said ring gear from rotation, and fluid pressure actuated means for holding said brake means stationary, said fluid pressure actuated means comprising a double acting piston movable in either of two directions to engage either of said brake means, rotation of said input shaft upon engagement of said brake means for said sun gear providing a forward reduction drive through said transmission to said output shaft, engagement of said brake means for said ring gear with release of said sun gear brake means producing a reverse rotation of said output shaft relative to said input shaft by rotation of said other turbine member in a direction opposite to the direction of rotation of said pump.

2. A transmission as in claim 1, wherein the fluid pressure actuated means has an intermediate position wherein neither of the brake means is engaged, said intermediate position corresponding to neutral position of the transmission wherein the drive between the input and output shafts is interrupted.

3. A transmission having an input shaft, an output shaft and means connecting said shafts, said means including a hydraulic torque converter and planetary gear means, said torque converter having a pump, a turbine and a stator member, said pump being conected to said input shaft, said gear means including a ring gear, a plurality of sun gears and a pinion meshing with said ring and sun gears, a carrier for said pinion connected to said output shaft, said sun gears being of equal size, brake means for one of said sun gears to provide a forward drive reaction member in said gear set, and brake means for said ring gear to provide a reverese drive reaction member in said gear set, one-way engaging means between said stator member and another of said sun gears, and clutch means connecting said input shaft to said output shaft by-passing said connecting means, rotation of said input shaft and engagement of said sun gear brake means effecting engagement of said one-way engaging means to prevent rotation of said stator member in a first stage of operation, said one-way engaging means being inoperative thereby permitting rotation of said stator member in a second stage of operation, engagement of said clutch means with the disengagement of said sun gear brake means constituting a third stage of operation of said transmission, engagement of said ring gear brake means with disengagement of said sun gear brake means and said clutch means effecting engagement of said one-way engaging means by rotation of said stator member in a reverse direction to constitute a fourth stage of operation wherein said output shaft is rotated in a direction opposite to the direction of rotation of said input shaft.

4. A transmission having an input shaft, an output shaft and means connecting said shafts, said means including a hydrodynamic drive device and planetary gear means, said drive device comprising a pump and a plurality of turbine members, said pump being connected to said input shaft, said gear means including a ring gear, a sun gear, a pinion meshing with said ring and sun gears, a carrier for said pinion connected to said output shaft, said ring gear being connected to one of said turbine members, means for holding said sun gear against rotation to provide reaction for drive of said carrier by said ring gear and one-way engaging means between said carrier and said ring gear for preventing faster forward rotation of said carrier than said ring gear while permitting faster forward rotation of said ring gear than said carrier.

5. Vibration dampening means for use in the combination of an engine and a transmission comprising an input shaft, an output shaft and means connecting said shafts, said meas including gear means having a driving member and a driven member, said driving member being operably connected to said input shaft, said driven member being connected to said output shaft, and clutch means connecting said input and output shafts, said gear means and said output shaft being relatively movable axially with respect to each other, and vibration dampening means between said input shaft and said output shaft, said dampening means being normally biased into engagement between said input and output shafts, engagement of said clutch means together with the engagement of said dampening means dampening the impulses from said input shaft through said output shaft, disengagement of said clutch means and application of torque through said gear means causing relative axial movement between said gear means and said output shaft to disengage said dampening means.

6. A vibration dampening means for use in the combination of an engine and a transmission comprising an input shaft, an output shaft and means connecting said shafts, said means including gear means having an input member and an output member, said input member being operably connected to said input shaft, said output member being connected to said output shaft, normally engaged dampening means between said input shaft and said output shaft for dampening the impulses of said input shaft, and direct drive clutch means between said input and output shafts, said gear means being relatively movable axially with respect to said output shaft, said gear means being positioned in close proximity to said dampening means for actuation thereof to a disengaged position by axial movement of said gear means in one direction, rotation of said input member from said input shaft moving said gear means to disengage said dampening means, with engagement of the direct drive clutch means causing movement of said gear means away from said dampening means permitting engagement of said dampening means to dampen the impulses from said input shaft by way of said output shaft.

7. A vibration dampening means comprising an engine driven input shaft, an output shaft and means connecting said shafts, said means including engageable clutch means for directly connecting said input and output shafts, and a normally engaged vibration dampening means between said shafts for dampening the impulses of said input shaft through said output shaft, said input shaft having an extension thereof, said dampening means including a friction disk mounted on said extension, said output shaft also having an extension formed with a friction disk thereon normally engaged with said first-mentioned friction disk, said input and output shaft extensions being of a length that the combination of the normally engaged dampening means together with the input and output shaft extensions acts as a torsion spring to dampen the impulses of said input shaft upon engagement of said clutch means.

8. Vibration dampening means for use in the combination of an engine and a transmission comprising an input shaft, an output shaft, and means connecting said shafts, said means including a hydrodynamic drive device and gear means, said drive device having input and output elements, said input element being connected to said input shaft, said gear means having input and output members, said output element driving said input member, said output member being connected to said output shaft, and dampening means in the connection between said shafts, said dampening means comprising a flexible flange attached to a portion of said output shaft, said flange having a friction face thereon, a flange formed on said input shaft having a friction face adapted to cooperate with and be normally engaged by said first-named friction face, clutch means connecting said input shaft and said output shaft, said flexible flange being positioned in abutting relationship with said gear means, said gear means being relatively slidable axially with respect to said output shaft upon application or release of torque from said output element, rotation of said input shaft with said clutch means engaged causing axial relative movement of said gear means with respect to said output shaft in a direction away from said flexible flange to permit engageemnt of said friction faces.

9. A vibration dampening means as in claim 8, wherein disengagement of said clutch and application of torque from said input shaft to said gear means through said output element effects axial sliding movement of said gear means with respect to said output shaft to engage said gear means with said flexible flange to disengage said friction faces permitting pulsations of said input shaft to be absorbed by said hydrodynamic drive device.

10. Vibration dampening means for use in the combination of an engine and a transmission, comprising an input shaft, an output shaft, and means connecting said shafts, said means including gear means having input and output members, said input member having an operable connection with said input shaft, said output member being connected to said output shaft, said output member having a flexible flange at one end, said flange having a friction face thereon, a cooperating friction face mounted on said input shaft, said gear means being constructed for relative axial movement with respect to said output shaft upon application or release of torque from said input shaft, and clutch means connecting said input and output shafts, rotation of said input shaft coupled with the engagement of said clutch means causing engagement of said friction faces by relative axial movement of said gear means on said output shaft, the pulsations of said input shaft to said output shaft being dampened through said friction faces.

11. A transmission having an input shaft, an output shaft and means connecting said shafts, said means including a hydrodynamic drive device and planetary gear means, said drive device comprising a pump and a plurality of turbine members, said pump being connected to said input shaft, said gear means including a ring gear, a plurality of sun gears, a pinion meshing with said ring and sun gears, a carrier for said pinion attached to said output shaft, and engageable clutch means for directly connecting said input and output shafts, one of said turbine members being connected with said ring gear, a first one-way engaging means connecting another of said turbine members with one of said sun gears, brake means, a second one-way engaging means connecting another of said sun gears with said brake means, initial rotation of said input shaft upon engagement of said brake means and both of said engaging means holding said another of said turbine members stationary providing one forward reduction drive from said input shaft through said transmission to said output shaft, release of said first one-way engaging means by rotation of said other turbine upon increased rotation of said input shaft providing a second forward reduction drive from said input shaft through said transmission to said output shaft, engagement of said clutch means providing a forward direct drive between said input and output shafts, and other clutch means connecting said ring gear and said carrier preventing relative forward rotation of said carrier with respect to said ring gear while permitting faster forward rotation of said ring gear than said carrier.

12. A gear train comprising a plurality of input shafts, an output shaft and planetary gear means connecting said shafts, a first one of said input shafts normally rotating in a forward direction, said gear means comprising drive, driven and reaction members, said drive member being connected to said forwardly rotating input shaft, said driven member being connected to said output shaft, and one of said reaction members being operably connected with another of said input shafts, brake means operably connected with another of said reaction members, and brake means for preventing rotation of said first forwardly rotating input shaft, said operable connection between said brake means and one of said reaction members comprising a first one-way engaging means, said operable connection between another of said input shafts and another of said reaction members comprising a second one-way engaging means, application of said reaction member brake means with a simultaneous rotation of the said first forwardly rotating input shaft causing the engagement of both of said one-way engaging means to prevent rotation of said another of said input shafts at low speeds of rotation of said first shaft, thereby providing a reduction drive through said gear means from said forwardly rotating input shaft to said output shaft, application of said brake means for said first shaft with release of said reaction member brake means providing a reverse reduction drive through said gear means from said other input shaft to said output shaft upon reverse rotation of said other input shaft, and one-way engaging means between said drive and driven members to prevent relative forward rotation of said driven member with respect to said drive member while permitting faster forward rotation of said drive member relative to said driven member.

References Cited in the file of this patent

UNITED STATES PATENTS

| | | |
|---|---|---|
| 2,312,849 | Pollard | Mar. 2, 1943 |
| 2,456,328 | Schneider | Dec. 14, 1948 |
| 2,609,708 | Burnett | Sept. 9, 1952 |
| 2,695,533 | Pollard | Nov. 30, 1954 |
| 2,890,602 | Smirl et al. | June 16, 1959 |